United States Patent
Choi

(10) Patent No.: US 9,310,993 B2
(45) Date of Patent: Apr. 12, 2016

(54) METHOD AND APPARATUS FOR MANAGING LISTS USING MULTI-TOUCH

(75) Inventor: Hyong Uk Choi, Seoul (KR)

(73) Assignee: Samsung Electronics Co., Ltd., Yeongtong-gu, Suwon-si, Gyeonggi-do (KR)

( * ) Notice: Subject to any disclaimer, the term of this patent is extended or adjusted under 35 U.S.C. 154(b) by 564 days.

(21) Appl. No.: 12/555,944

(22) Filed: Sep. 9, 2009

(65) Prior Publication Data

US 2010/0088641 A1    Apr. 8, 2010

(30) Foreign Application Priority Data

Oct. 6, 2008    (KR) ...................... 10-2008-00997700

(51) Int. Cl.
| | | |
|---|---|---|
| *G06F 3/0482* | (2013.01) | |
| *G06F 3/0488* | (2013.01) | |
| *G11B 27/034* | (2006.01) | |
| *G11B 27/34* | (2006.01) | |

(52) U.S. Cl.
CPC .......... *G06F 3/04883* (2013.01); *G06F 3/0482* (2013.01); *G11B 27/034* (2013.01); *G11B 27/34* (2013.01); *G06F 2203/04808* (2013.01)

(58) Field of Classification Search
CPC ................ G06F 3/0488; G06F 3/0482; G06F 2203/04808
USPC ......................................................... 715/863
See application file for complete search history.

(56) References Cited

U.S. PATENT DOCUMENTS

| | | | |
|---|---|---|---|
| 6,266,057 B1 | 7/2001 | Kuzunuki et al. | |
| 6,295,060 B1 | 9/2001 | Lentz et al. | |
| 7,629,966 B2 * | 12/2009 | Anson | 345/173 |
| 7,643,012 B2 * | 1/2010 | Kim et al. | 345/173 |
| 7,835,999 B2 * | 11/2010 | Block | 706/15 |
| 7,840,912 B2 * | 11/2010 | Elias et al. | 715/863 |
| 7,861,187 B2 * | 12/2010 | Diederiks et al. | 715/860 |

(Continued)

FOREIGN PATENT DOCUMENTS

| | | |
|---|---|---|
| CN | 101046717 A | 10/2007 |
| CN | 101110084 A | 1/2008 |

(Continued)

OTHER PUBLICATIONS

EOM, Ju-il; Patent Application Publication No. US 2008/0082920 A1; Publication Date: Apr. 3, 2008; "Apparatus and Method for Displaying Variable-Sized, Grouped Display Information . . . ;" . . . .

(Continued)

*Primary Examiner* — Alvin Tan
(74) *Attorney, Agent, or Firm* — Cha & Reiter, LLC

(57) ABSTRACT

A list managing method and apparatus that manage a list of content in a portable terminal having a touch screen according to multi-touch signals are disclosed. The method includes: detecting multi-touch signals input to a list on a touch screen; determining whether the multi-touch signals are input for a period of time equal to or greater than an activation time period; designating, if the multi-touch signals are input within the activation time period, the entire list with a selection area for altering a structure of a list; identifying a gesture generated by the multi-touch signals; expanding or contracting the structure of the entire list according to the gesture; and displaying the altered structure of the entire list on the touch screen.

16 Claims, 12 Drawing Sheets

(56) References Cited

U.S. PATENT DOCUMENTS

| | | | |
|---|---|---|---|
| 8,065,603 B2* | 11/2011 | Gossweiler et al. | 715/227 |
| 2005/0184959 A1 | 8/2005 | Kompe et al. | |
| 2005/0268253 A1 | 12/2005 | Johnson et al. | |
| 2007/0103452 A1 | 5/2007 | Wakai et al. | |
| 2007/0177804 A1 | 8/2007 | Elias et al. | |
| 2007/0229471 A1 | 10/2007 | Kim et al. | |
| 2008/0018670 A1 | 1/2008 | Araki | |
| 2008/0036743 A1* | 2/2008 | Westerman et al. | 345/173 |
| 2008/0165141 A1* | 7/2008 | Christie | 345/173 |
| 2008/0168404 A1 | 7/2008 | Ording | |
| 2008/0189629 A1 | 8/2008 | Diederiks et al. | |
| 2008/0270886 A1 | 10/2008 | Gossweiler et al. | |
| 2009/0006292 A1 | 1/2009 | Block | |
| 2009/0189868 A1* | 7/2009 | Joo et al. | 345/173 |
| 2010/0070913 A1* | 3/2010 | Murrett et al. | 715/786 |
| 2010/0134425 A1* | 6/2010 | Storrusten | 345/173 |
| 2010/0283743 A1* | 11/2010 | Coddington | 345/173 |

FOREIGN PATENT DOCUMENTS

| | | |
|---|---|---|
| CN | 101256464 A | 9/2008 |
| JP | 7-175587 A | 7/1995 |
| JP | 2000-163193 A | 6/2000 |
| JP | 2000-267808 A | 9/2000 |
| JP | 2001-290585 A | 10/2001 |
| JP | 2004-265244 A | 9/2004 |
| JP | 2006-244326 A | 9/2006 |
| JP | 2007-272904 A | 10/2007 |
| JP | 2008-27001 A | 2/2008 |
| KR | 10-0672605 B1 | 1/2007 |
| KR | 2008-0082683 | 9/2008 |
| WO | WO 2008/086218 | 7/2008 |

OTHER PUBLICATIONS

Christie, Greg, et al.; Patent Application Publication No. US 2008/0165136 A1; Publication Date: Jul. 10, 2008; "System and Method for Managing Lists;" . . . .

Kairls, Jr., Richard J.; Patent Application Publication No. US 2004/0178994 A1; Publication Date: Sep. 16, 2004; "Dynamic Resizing of Clickable Areas of Touch Screen Applications;" . . . .

* cited by examiner

FIG. 4A

| Music | Indicator ♫ |
|---|---|
| A | |
| B | |
| C | |
| D | |
| E | |
| F | |
| ... | |

FIG. 4B

| Music | Indicator ♫ |
|---|---|
| A | |
| AX | |
| AY | |
| AZ | |
| B | |
| BX | |
| C | |
| CX | |
| CY | |
| ... | |

FIG. 4C

| Music | Indicator ♫ |
|---|---|
| A | |
| B | |
| C | |
| D | |
| E | |
| F | |
| ... | |

US 9,310,993 B2

METHOD AND APPARATUS FOR MANAGING LISTS USING MULTI-TOUCH

CLAIM OF PRIORITY

This application claims the benefit of the earlier filing date, pursuant to 35 USC 119, to that patent application entitled "METHOD AND APPARATUS FOR MANAGING LISTS USING MULTI-TOUCH" filed in the Korean Intellectual Property Office on Oct. 6, 2008 and assigned Serial No. 10-2008-0097700, the contents of which are incorporated herein by reference.

BACKGROUND OF THE INVENTION

1. Field of the Invention

The present invention relates to portable terminals having a touch screen, and more particularly, to a method and apparatus that manages a list of contents in a portable terminal, expanding or contracting the structure of the list, according to multi-touch signals.

2. Description of the Related Art

As information and communication technology and semiconductor technology have undergone rapid development, a variety of portable terminals having a touch screen have been commonly used. In particular, the touch screen mounted on these portable terminals allows for a multi-touch operation as an optional function. In addition to their inherent functions, such as a voice call and text message transmission and reception, these portable terminals can also provide a variety of functions, such as multi-media communication, wireless Internet communication, short-range wireless communication, and mobile broadcast reception, etc. A variety of multi-media content and applications have also been developed to match the various functions.

Along with the development of various multi-media contents and functions, the capacity and types of lists related to the multi-media have also increased when the function are activated in the portable terminals. Therefore, it is very important to sort and manage the lists of content in order to efficiently use the portable terminals.

However, the conventional system using direction keys or a mouse to sort a variety of lists stored in the portable terminal is cumbersome and time consuming and the user may be required to perform complicated processes to manage the lists of content that is stored in the portable device (terminal).

SUMMARY OF THE INVENTION

The present invention provides a method and apparatus that can expand or contract a list of contents using multi-touch operations, thereby allowing a user to intuitive recognize a structure of a list.

The present invention further provides a method and apparatus that can sort content by a variety of categories and allow lists of categories to move one to another, using multi-touch operation.

In accordance with an exemplary embodiment of the present invention, the present invention provides a method for managing lists using multi-touch, including: detecting multi-touch signals input to a list on a touch screen; determining whether the multi-touch signals are input for a length of time equal to or greater than an activation time; designating, if the multi-touch signals are input for at least the activation time, the entire list with a selection area for altering a structure of a list; identifying a gesture generated by the multi-touch signals, wherein the gesture is selected one of: expanding and contracting the structure of the entire list, expanding or contacting the list according to the identified gesture; and displaying the altered structure of the entire list on the touch screen.

In accordance with another exemplary embodiment of the present invention, the present invention provides an apparatus for managing lists using multi-touch, including: a display unit for displaying a list on a touch screen, and a controller that determines whether multi-touch signals are input for a length of time equal to or greater than an activation time, designates the entire list with a selection area for altering a structure of a list, if the multi-touch signals are input at least the activation time, identifies a gesture generated by the multi-touch signals, wherein the gesture is selected as one of: expanding and contracting the structure of the entire list according to the identified gesture.

BRIEF DESCRIPTION OF THE DRAWINGS

The features and advantages of the present invention will become more apparent from the following detailed description in conjunction with the accompanying drawings, in which:

FIG. 4A to FIG. 4E show user interfaces for describing alterations regarding the entire list of contents according to an embodiment of the present invention;

DETAILED DESCRIPTION OF INVENTION

Figure 1:
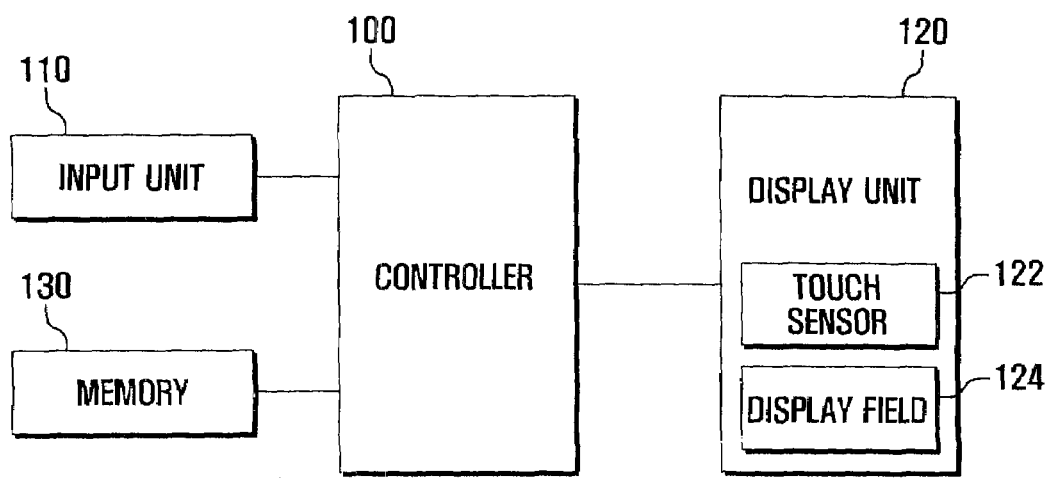
FIG. 1 is a schematic block diagram illustrating a portable terminal according to an embodiment of the present invention.

Now, embodiments of the present invention are described in detail with reference to the accompanying drawings. The same reference numbers are used throughout the drawings to refer to the same or similar parts. Detailed descriptions of well-known functions and structures incorporated herein may be omitted to avoid obscuring the subject matter of the present invention.

The terms or words described in the present description and the claims should not be limited by a general or lexical meaning, instead should be analyzed as a meaning and a concept through which the inventor defines and describes the present invention at his most effort, to comply with the idea of the present invention. Therefore, one skilled in the art will understand that the embodiments disclosed in the description and configurations illustrated in the drawings are only preferred embodiments, instead there may be various modifications, alterations, and equivalents thereof to replace the embodiments at the time of filing this application.

In the following description, although the present invention is described based on a portable terminal having a touch screen allowing for multi-touch operation, it will be appreciated that the portable terminal can be applied to all information communication devices, multi-media devices, and their applications, such as, a mobile phone, a personal digital assistant (PDA), a code division multiple access (CDMA) terminal, a wideband code division multiple access (WCDMA) terminal, a global system for mobile communication (GSM) terminal, an international mobile telecommunication 2000 (IMT-2000) terminal, a smart phone, a universal mobile telecommunication service (UMTS) terminal, a personal computer, a laptop computer, etc.

In an embodiment of the present invention, the term 'multi-touch' means that touch signals are generated at at least two or more points on a touch screen, and these signals are called multi-touch signals. That is, if simultaneous touches occur on the touch screen, it is determined that multi-touch signals are generated. In addition, if a time between two touches is within a certain preset time period, it is also determined that those touches generate multi-touch signals.

In an embodiment of the present invention, the term an 'activation time' refers to a length of time that multi-touch signals continue being input on a touch screen for a preset time period. The activation time is a reference time for altering the entire list of contents or a particular portion of a list, and is compared with the length of time of the multi-touch signal input. If multi-touch signals continue being input for a length of time equal to or greater than the activation time, this input multi-touch signals are deemed to be "long input multi-touch signals," and accordingly a particular portion of a list is expanded or contracted. On the contrary, if multi-touch signals do not continue being input for the activation time, these input multi-touch signals are deemed to be "short input multi-touch signals," and accordingly the entire list of contents is expanded or contracted.

In an embodiment of the present invention, the term a "gesture" refers to a motion or a motion signal for expanding a list of content from a higher hierarchy to a lower hierarchy or contracting the list of content from a lower hierarchy to a higher hierarchy, according to the inputted multi-touch signals. That is, the motion signal is determined by using a variation of a distance value between two points where the initial multi-touch signals are generated according to multi-drag signals. The multi-drag signals are generated after the input of multi-touch signals is detected on a touch screen. If the distance value between two points where the initial touch signal is generated is increased greater than the initial distance value according to a touch-drag signal, the input gesture is deemed to be a motion signal to expand a list. On the contrary, if the distance value between two points where the initial touch signal is generated is decreased greater than the initial distance value according to a drag signal, the input gesture is deemed to be a motion signal to contract a list.

It should be understood that the gesture could be a motion or a motion signal generated by a single touch. In that case, a single touch can be determined as a motion signal to expand or contract a list by using a drag signal that is generated at one of the points where the initial multi-touch signals are input.

In an embodiment of the present invention, an example of a particular content is music. It should be understood that the content according to the present invention is not limited to the embodiment, but may be movies, photographs, electronic books, directories, libraries, etc.

In an embodiment of the present invention, expanding a list means that a structure of a list is unfolded from a higher hierarchy to a lower hierarchy and then displayed on a touch screen. If a list expansion signal is detected, an item contained in a higher hierarchy is unfolded to display sub-items in a lower hierarchy on the touch screen. An event regarding a list expansion occurring at the lowest hierarchy may not be performed.

In an embodiment of the present invention, contracting a list means that a structure of a list is folded from a lower hierarchy to a higher hierarchy and then displayed on a touch screen. If a list contraction signal is detected, sub-items contained in a lower hierarchy are folded to display an item in a higher hierarchy on the touch screen. An event regarding a list contraction occurring at the highest hierarchy may not be performed.

FIG. 1 is a schematic block diagram illustrating a portable terminal according to an embodiment of the present invention.

Referring to FIG. 1, the portable terminal includes a controller 100, an input unit 110, a display unit 120, and a memory 130. The display unit 120 includes a touch sensor 122 and a display field 124.

The input unit 110 includes a plurality of keys for receiving numbers and letter information and function keys for setting a variety of functions. The functions keys include direction keys, side keys, a wheel key and a variety of setting keys. The input unit 110 may be implemented with a touch screen. In that case, the input unit 110 also performs the function of the display unit 120. The input unit 110 also outputs key signals, related to a user's setting and the portable terminal control, to the controller 100.

The display unit 120 displays operation states, operation results, and other forms of information, as the applications and programs within the portable terminal are executed. The display unit 120 can also display menus of the portable terminal, user data input by a user, function setting information, and other types of information. The display unit 120 may be implemented by a display device, such as a liquid crystal display (LCD), an organic light emitting diode (OLED), etc. In an embodiment of the present invention, the display unit 120 is implemented by a touch screen. In particular, the display unit 120 includes a touch sensor 122 and a display field 124. In that case, the display unit 120 can perform the function of the input unit 110.

In an embodiment of the present invention, the touch sensor 122 generates a corresponding voltage and current signal at a position where a touch panel is pressed, so as to input a user's indicating command or graphic information. The touch sensor 122 detects a change in a physical quantity of an input signal, for example, a resistance, a capacitance, etc., and senses the occurrence of a touch signal. The touch sensor 122 is configured in such a way that a touch panel, an LC panel, and a backlight are contacted in order. The touch sensor 122 may further include signal lines for providing signals from the touch panel to the controller 100, and a tape carrier package, connected to the lower plate of the LC panel, for applying an electrical signal to a driving unit of the LC panel. Structures of touch screen panels are well-known in the art and need not be described in detail herein.

The display field 124 displays a variety of information related to states and operations of the portable terminal. In an embodiment of the present invention, the display field 124 highlights and displays a list of a particular content and a corresponding list according to a multi-touch signal input by a user. The display field 124 can also display a structure of a list of content, expanding from a higher hierarchy to a lower hierarchy or contracting from a lower hierarchy to a higher hierarchy, according to a multi-touch signal.

The memory 130 stores applications or programs required to operate the portable terminal according to the present invention. It includes a program area and a data area (not shown).

The program area stores an operating system (OS) for booting the portable terminal. It also stores a program for expanding or contracting a structure of a list of a particular content from a higher hierarchy to a lower hierarchy or from a lower hierarchy to a higher hierarchy, according to an input multi-touch signal. The program area further stores a program for displaying an expanded or contracted list structure on a touch screen, and a program for determining whether the entire list of content or a particular portion of a list is selected with respect to an activation time. In addition, a program for identifying a gesture according to a multi-touch signal may be stored in the program area. In particular, in an embodiment of the present invention, if a structure of a list of content is varied, such as expanded or contracted, according to multi-touch, the data area stores the varied structure of the expanded or contracted list.

The controller 100 controls the entire operation of the portable terminal and signal flow among the elements included in the portable terminal. In particular, the controller 100 detects an input signal for executing a list management mode via the input unit 110, and then manages a list of a particular content in the list management mode.

The controller 100 performs a corresponding event according to a detected multi-touch signal. That is, the controller 100 detects a multi-touch signal applied to a list of content on the display unit 120, and then compares a length of time of the multi-touch signal is present with an activation time to determine whether the multi-touch signal corresponds to a signal for changing a structure of the entire list or a structure of a particular portion of the list. If the controller 100 ascertains that the time of the input multi-touch signal is equal to or greater than (i.e., at least) the activation time, the input multi-touch signal is identified as a "long input multi-touch signal" and expands or contracts a partial list of contents in accordance with a direction of a gesture, as will be further described. However, if the controller 100 ascertains that the length of time of the multi-touch signal input is less than the activation time, the input multi-touch signal is identified as a "short input multi-touch signal" and expands or contracts the entire list of contents in accordance with a direction of a gesture, as will be further described.

When the controller 100 ascertains that a multi-touch signal, input to a particular portion of list, corresponds to a signal for changing the particular portion of list, the controller causes to be highlighted and displayed the particular portion of list. The controller 100 also designates the particular portion of a list to which the multi-touch signal is input, as a selection area.

The controller 100 performs a corresponding operation according to a gesture of a multi-touch signal. More specifically, the controller 100 detects an initial distance between at least two touch points on the touch screen where the initial multi-touch signals are generated, i.e., the initial distance. If the controller 100 detects that the distance between the multi-touch signals is increased greater than the initial distance according to a drag signal, the controller deems the input gesture as a signal for expanding a list. A drag signal is determined as being the detection of a continuous input from a first touch point to a second touch point. The controller 100 expands and displays the entire list or a particular portion of list from a higher hierarchy to a lower hierarchy according to the expansion gesture. Similarly, if the controller 100 detects that a distance is decreased from the initial distance according to a drag signal, the controller 100 identifies the input gesture as a signal for contracting. The controller 100 then contracts and displays the entire list or a particular portion of the list from a lower hierarchy to a higher hierarchy according to the list expansion gesture.

The controller 100 can display a structure of a list of content in an icon or a thumbnail form. More specifically, if the controller 100 ascertains that icons are selected by a multi-touch signal, the controller 100 designates the selected icons with a selection area. The selection area may refer to an area that contains a plurality of icons integrally contracted together as a single icon by a multi-touch. The selection area may also refer to an area where respective icons are separated and expanded. The controller 100 can highlight and display the icons in the selection area.

The controller 100 recognizes the icons, designated in the selection according to a multi-touch signal, as a target object to be contracted or expanded.

For example, if a gesture for collecting the selected icons into a single icon occurs, the controller 100 contracts the icons designated in the selection area, and then generates a single, contracted, icon. That is, if the controller 100 ascertains that a distance between two touch points, where the initial multi-touch signals are generated, i.e., the initial distance, is decreased according to a drag signal, the controller 100 collects the icons in the selection area and generates a contracted, integral, icon. After that, the controller 100 controls the display unit 120 to display the integral icon, generated by contracting the icons in the selection area. Similarly, if a gesture for expanding the selected icons occurs, the controller 100 separately expands the icons in the selection area into individual icons. That is, if the controller 100 ascertains that a distance between two touch points, where the initial multi-touch signals are generated, i.e., the initial distance, is increased according to a drag signal, the controller 100 expands the icons in the selection area and generates individual icons. After that, the controller 100 separates the single contracting icon, formed by contracting a plurality of icons, into individual icons and displays them on the touch screen of the display unit 120.

The controller 100 displays a single icon representing at least two icons or respective expanded icons on a touch screen, according to an arrangement option. The arrangement option includes a location fixing arrangement and an automatic arrangement.

In an embodiment of the present invention, if the controller 100 detects a single touch signal from a touch screen displaying a particular list of content, the controller 100 expands and displays a structure of a list corresponding to a particular portion of the list from a higher hierarchy to a lower hierarchy, according to the detected touch signal. The controller 100 can detect touch signals corresponding to a variety of touches, for example, a double click, a swing, etc.

In an embodiment of the present invention, if the controller 100 detects a touch signal on lists of content displayed on a touch screen by categories, it can integrate the displayed lists by categories. As an example of content, music can be sorted by a variety of categories, such as title, musical composer, musician, genre, album, etc. In that case, the controller 100 can display a piece of music, based on such a variety of categories, on the touch screen. After that, if the controller 100 detects a touch signal, the controller 100 may integrate the categories of the piece of music and display the integrated category on the touch screen.

In the following description, a method for managing lists using multi-touch in a portable terminal is explained in detail with reference to the attached drawings.

Figure 2:
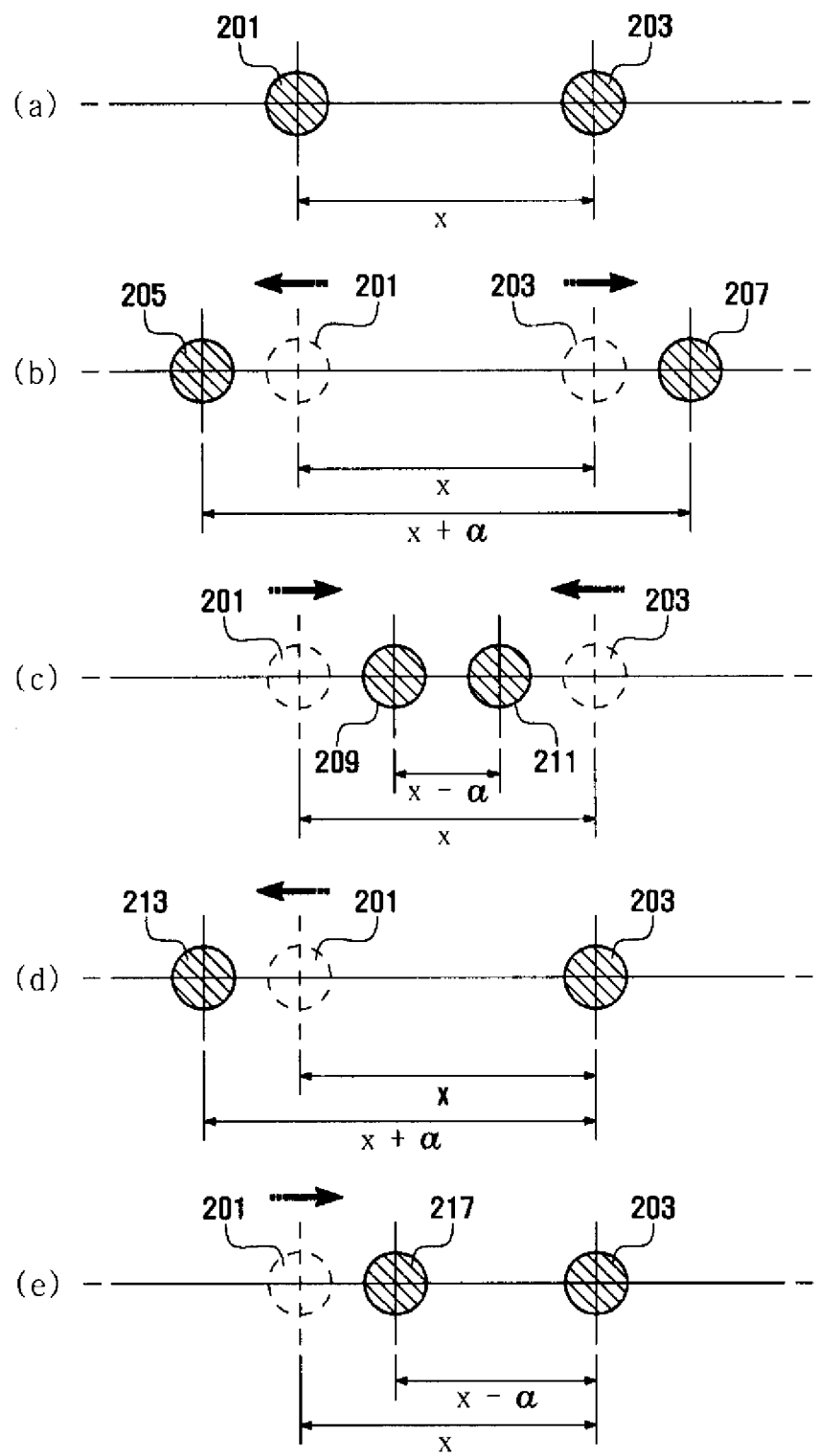
FIG. 2 including figures (a)-(e) are views describing a gesture according to an embodiment of the present invention.

FIG. 2 including subfigures (a)-(e) are views describing a gesture according to an embodiment of the present invention.

As shown in FIG. 2(*a*), the controller 100 detects a multi-touch signal input on a touch screen. It is assumed that multi-touch signals are input at touch points 201 and 203, and an initial distance between the two touch points is denoted by 'x'. The distance 'x' is compared with a distance that is generated, according to a gesture corresponding to subsequently input multi-touch signals, in order to expand or contract a structure of a list from a higher hierarchy to a lower hierarchy or from a lower hierarchy to a higher hierarchy.

As shown in FIG. 2(b), the controller 100 detects positions of touch points 205 and 207, moving from the touch points 201 and 203 where the multi-touch signals are initially input, according to a drag signal. A distance between the moved touch points 205 and 207 then becomes x+a. The controller 100 ascertains that the distance between the moved touch points 205 and 207, x+a, is greater than the distance, x between two points 201 and 203 by the amount "a". In that case, the controller 100 identifies the input drag signal as a gesture for expanding a list, and then expands a structure of the list from a higher hierarchy to a lower hierarchy.

As shown in FIG. 2(c), the controller 100 detects the positions of touch points 209 and 211, moving from the touch points 201 and 203 where the multi-touch signals are initially input, according to a drag signal. A distance between the moved touch points 209 and 211 then becomes x−a. The controller 100 ascertains that the distance between the touch points 209 and 211, x−a, is less than the initial distance, x, between points 201 and 203 by "a". In that case, the controller 100 identifies the input drag signal as a gesture for contracting a list, and then contracts a structure of the list from a lower hierarchy to a higher hierarchy.

As shown in FIG. 2(d), the controller 100 detects a position of a touch point 213, moving from one point, for example, 201, of the touch points 201 and 203 where the multi-touch signals are initially input, according to a drag signal. A distance between the moved touch points 213 and the initially touched point 203 becomes x+a. The controller 100 ascertains that the distance between the moved touch points 213 and the initially touched point 203, x+a, is greater than the distance, x, between the two points 201 and 203 by the value of 'a'. In that case, the controller 100 identifies the input drag signal as a gesture for expanding a list, and then expands a structure of the list from a higher hierarchy to a lower hierarchy.

As shown in FIG. 2(e), the controller 100 detects a position of a touch point 217, moving from one point, for example, 201, of the touch points 201 and 203 where the multi-touch signals are initially input, according to a drag signal. A distance between the moved touch points 217 and the initially touched point 203 becomes x−a. The controller 100 ascertains that the distance between the touch points 217 and the initially touched point 203, x−a, is less than the distance, x, between the two points 201 and 203 by the value of 'a.' In that case, the controller 100 identifies the input drag signal as a gesture for contracting a list, and then contracts a structure of the list from a lower hierarchy to a higher hierarchy.

Figure 3:
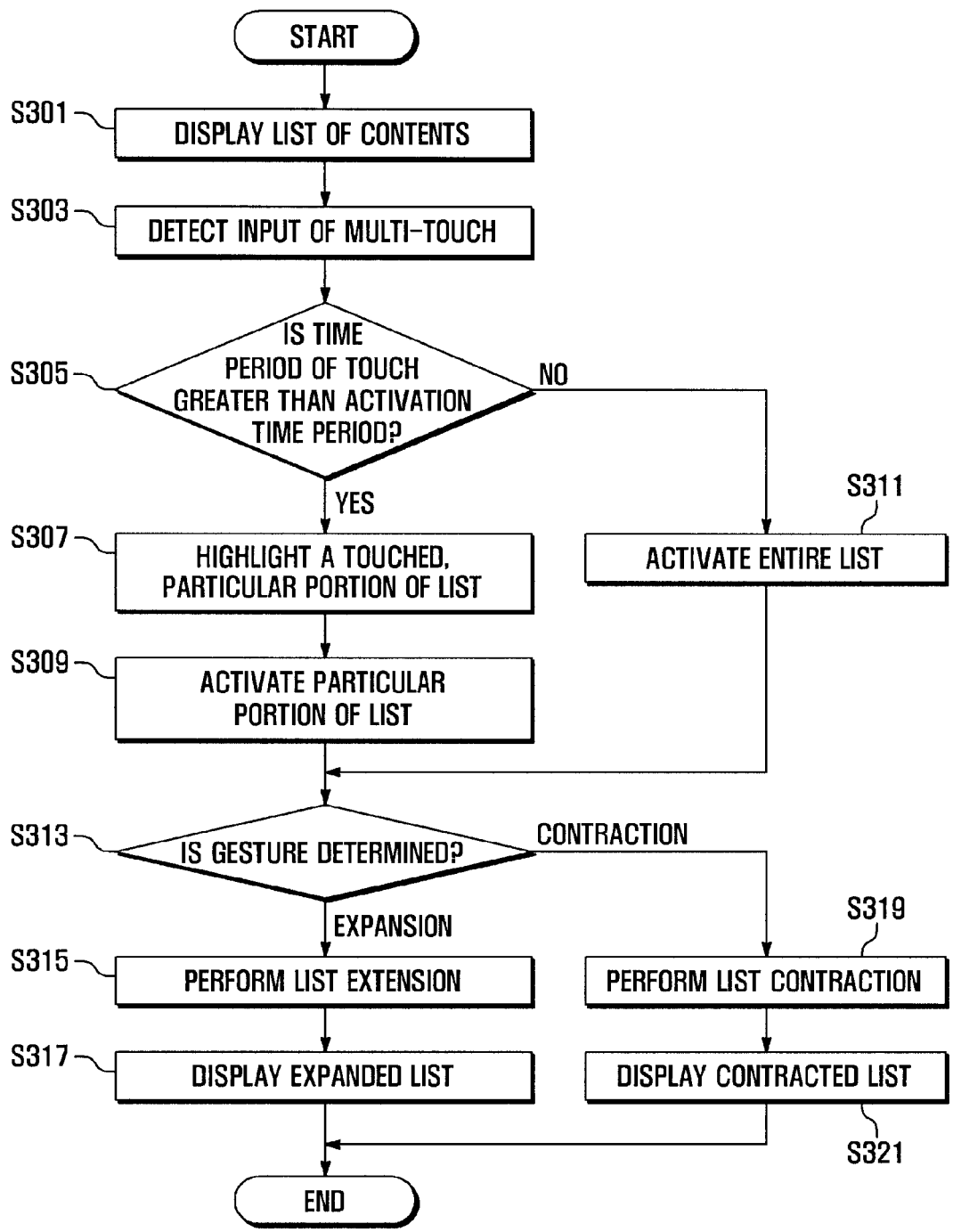
FIG. 3 is a flow chart describing a method for managing a list in a portable terminal by using multi-touch according to an embodiment of the present invention.

FIG. 3 is a flow chart describing a method for managing a list in a portable terminal by using multi-touch, according to an embodiment of the present invention.

Referring to FIG. 3, the controller 100 controls the display unit 120 to display a list of a particular content (301). The particular content refers to content for managing a list, and is illustrated as music in an embodiment of the present invention. (See FIG. 4A, for example). It should be understood that the present invention is not limited to the embodiment, and that the teachings of the present invention can be applied to a variety of contents.

The controller 100 detects the input of a multi-touch signal (303). Then, the controller 100 determines whether an input time period of the multi-touch signal is equal to or greater than an activation time period (305). That is, the controller 100 compares the length of time of a the multi-touch signal with an activation time period to determine whether the input multi-touch signal corresponds to a signal for changing the structure of the entire list or the structure of a particular portion of the list. For example, if the controller 100 ascertains that the multi-touch signal continues being input for more than an activation time period, the controller executes an operation to change a structure of a particular portion of a list. On the contrary, if the controller 100 ascertains that the multi-touch signal continues being input for less than the activation time, the controller executes an operation to change a structure of the entire list.

More specifically, if the controller 100 ascertains that the multi-touch signal continues being input for more than an activation time period at 305, it highlights and displays the multi-touched particular portion of a list (307). After the controller 100 designates the particular portion of a list of contents as a selection area for changing the structure of list and then activates the selected portion (309). However, if the controller 100 ascertains that the multi-touch signal continues being input for less than an activation time period 305, the controller 100 activates the entire list of contents as a target object for changing the structure of the entire list (311).

The embodiment of the present invention may also be implemented in such a way that the controller 100 designates and activates a selected particular portion of a list of contents as a selection area and then highlights and displays the list in the multi-touched selection area. In that case, the controller 100 can simultaneously perform a process of activating a selection area of a particular selected list input by a multi-touch signal and a process of highlighting it.

The controller 100 identifies gestures based on movement f the signals on the touch screen and determines the function of gestures, according to input touch signals (313). That is, the controller 100 determines whether a gesture is intended to expand or contract the structure of a list according to a drag signal that is generated from the multi-touch signals input on a touch screen displaying a list of contents. If the controller 100 ascertains that the distance between the initially touched two points is increased more than the initial distance according to a drag signal, the controller identifies the input touch signals as a gesture for expanding the structure of a list. However, if the controller 100 ascertains that the distance between the initially touched two points is decreased more than the initial distance according to a drag signal, the controller identifies the input touch signals as a gesture for contracting the structure of a list. For example, the controller 100 can identify and determine whether a gesture is designed to expand a structure of a list from a higher hierarchy to a lower hierarchy or to contract the structure of a list from a lower hierarchy to a higher hierarchy, according to a drag signal input after a particular portion of list is activated in a selection area.

If the controller 100 ascertains that the multi-touch signal corresponds to a gesture for expanding a structure of a list at 313, the controller 100 expands a structure of a corresponding list from a higher hierarchy to a lower hierarchy (315). For example, if the entire list is activated to change its structure, the controller 100 expands the structure of the entire list from a higher hierarchy to a lower hierarchy. In addition, if a particular portion of list is activated with a selection area, the controller 100 expands the structure of the selection area from a higher hierarchy to a lower hierarchy.

The controller 100 controls the display unit 120 to display the expanded structure of the list on its touch screen (317). For example, if the entire list is activated to change its structure, the controller 100 displays the expanded structure of the entire list on the touch screen. Additionally, if a particular portion of list is activated with a selection area, the controller 100 displays the expanded structure of the particular portion of the list on the touch screen.

However, if the controller 100 ascertains that the multi-touch signal corresponds to a gesture for contracting a structure of a list at 313, it contracts a structure of a corresponding list from a lower hierarchy to a higher hierarchy (319). For example, if the entire list is activated to change its structure, the controller 100 expands the structure of the entire list from a lower hierarchy to a higher hierarchy. In addition, if a particular portion of list is activated with a selection area, the controller 100 contracts its structure from a lower hierarchy to a higher hierarchy.

The controller 100 controls the display unit 120 to display the contracted structure of list on its touch screen (321). For example, if the entire list is activated to change its structure, the controller 100 displays the contracted structure of the entire list on the touch screen. Additionally, if a particular portion of list is activated with a selection area, the controller 100 displays the contracted structure of the particular portion of the list on the touch screen.

In the following description, examples of a touch screen implementing the list managing method using multi-touch, described above, are explained with reference to the attached drawings.

FIG. 4A to FIG. 4E are user interfaces that describe an alteration in the entire list of contents according to an embodiment of the present invention.

As shown in FIG. 4A, the controller 100 displays on a touch screen a structure of a list of content as the highest hierarchy. When the controller 100 detects a multi-touch signal (not shown), corresponding a gesture, on a touch screen displaying the list of content, the controller 100 alters the structure of the list of content according to the multi-touch signal. For example, if the controller 100 ascertains that the multi-touch signal corresponds to a signal for expanding a structure of list, it expands and displays the structure of a list of content from a higher hierarchy to a lower hierarchy as shown in FIG. 4B. However, if the controller 100 detects the multi-touch signal corresponds to a signal for contracting a structure of list that was expanded to a lower hierarchy, the controller 100 contracts and displays the structure of a list of content from the lower hierarchy to a higher hierarchy as shown in FIG. 4C.

Figure 4D:
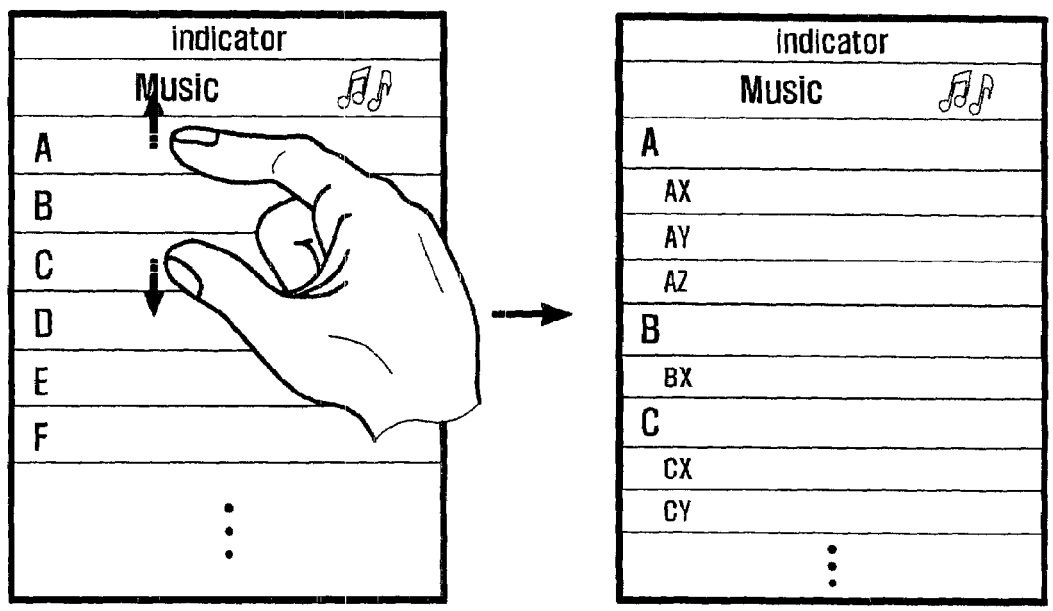
Figure 4E:
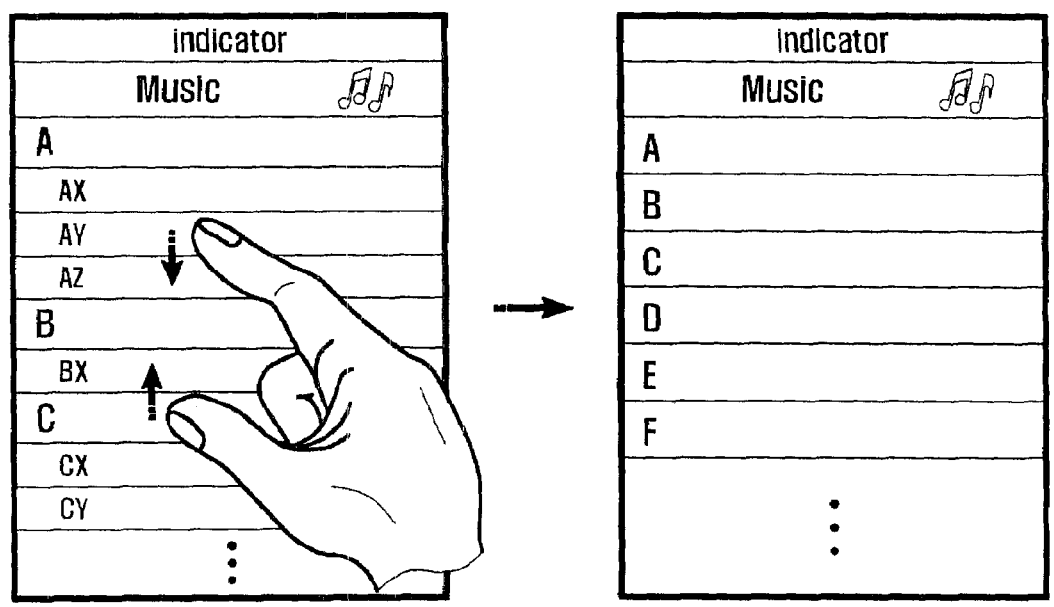

The controller 100 identifies a gesture as to whether to change a structure of a list, via an event that a multi-touch signal is input over a brief period and an event that the distance between the initially multi-touched two points is altered by a drag signal. For example, if the controller 100 ascertains that a gesture corresponds to a multi-touch signal for expanding a structure of a list, it expands and displays a structure of the entire list, on the screen, from a higher hierarchy to a lower hierarchy, as shown in FIG. 4D. On the contrary, if the controller 100 ascertains that a gesture corresponds to a multi-touch signal for contracting a structure of a list, the controller 100 contracts and displays a structure of the entire list, on the touch screen, from a lower hierarchy to a higher hierarchy. See FIG. 4E, wherein the directional arrows between the illustrated finger and thumb represent a contraction gesture.

FIG. 5A to FIG. 5F illustrate user interfaces that describe an alteration regarding a particular portion of a list of content according to an embodiment of the present invention.

Referring to FIG. 5A to FIG. 5F, when a multi-touch signal is input over a long period, the controller 100 highlights and displays a particular portion of a list, and designates and activates it in a selection area.

Figure 5A:
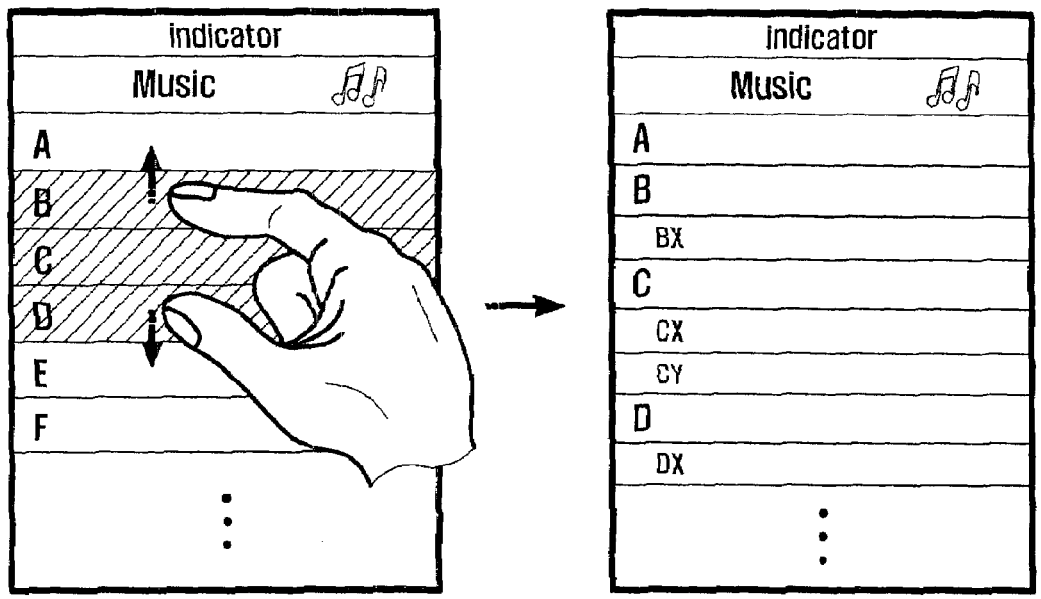
FIG. 5A to FIG. 5F show user interfaces for describing alterations regarding a particular portion of a list of contents according to an embodiment of the present invention.

After that, if the controller 100 detects that a distance between the initially multi-touched two points is increased by a drag signal, it ascertains that the gesture is designed to expand a structure of the particular portion of list. For example, as shown in FIG. 5A, if the controller 100 ascertains that multi-touches are applied onto items 'B' and 'D' in the list on the touch screen, the controller 100 highlights and displays the items from 'B' to 'D', and then designates and activates them in a selection area. After that, according to multi-touch signals corresponding to an expansion gesture, the controller 100 expands 'B' on a portion of list at a higher hierarchy and displays element 'Bx' at a lower hierarchy on the touch screen; expands 'C' on a portion of list at a higher hierarchy and displays items 'Cx' and 'Cy' at a lower hierarchy; and expands 'D' on a portion of list at a higher hierarchy and displays item 'Dx' at a lower hierarchy.

Figure 5B:
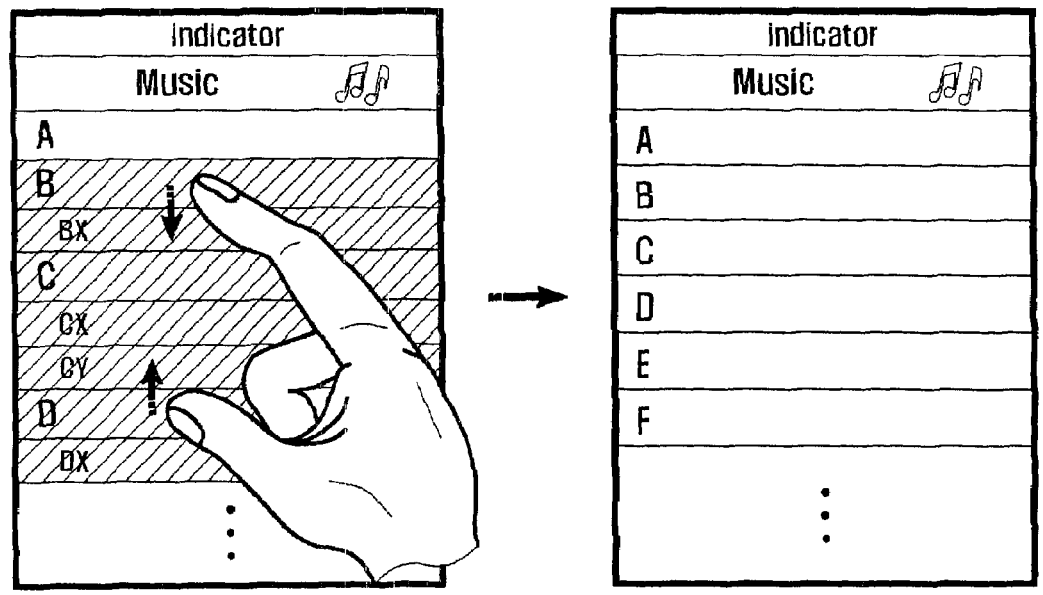

However, if the controller 100 detects that a distance between the initially multi-touched two points is decreased by a drag signal, the controller 100 ascertains that the gesture is designed to contract a structure of the particular portion of list. For example, as shown in FIG. 5B, if the controller 100 ascertains that multi-touches are applied onto items 'B' and 'D' in the list on the touch screen, the controller 100 highlights and displays the items from 'B' to 'D', and then designates and activates them in a selection area. After that, according to multi-touch signals corresponding to a contraction gesture, the controller 100 contracts from the expanded structure of portions of a list at a lower hierarchy to a structure of a list 'B', 'C', and 'D' at a higher hierarchy, respectively.

Figure 5C:
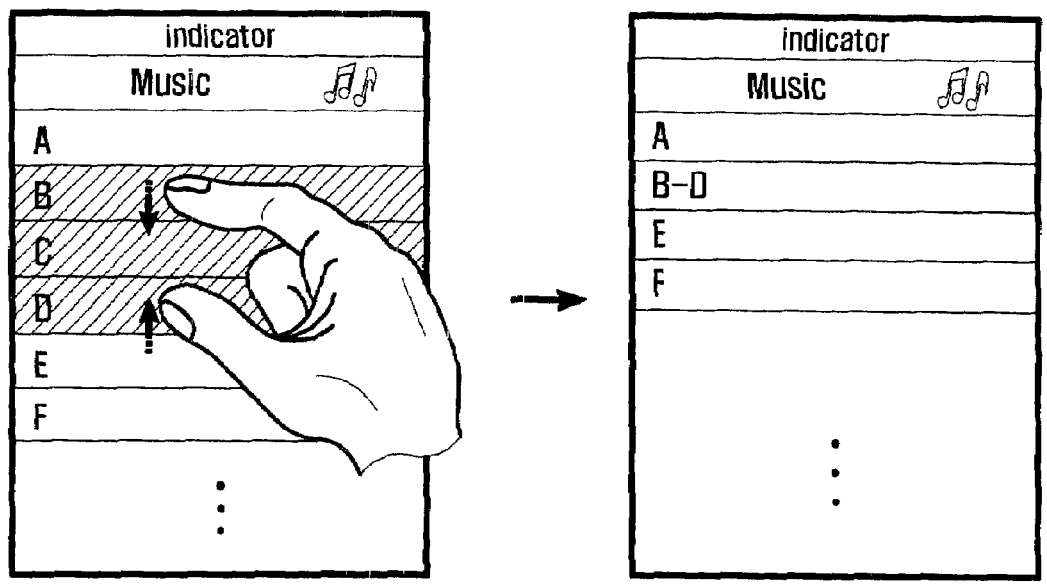

When a multi-touch signal is input onto a particular portion of list displayed at a higher hierarchy, the controller 100 can further contract and display the particular portion of list. If a multi-touch touch signal is input on a touch screen displaying a structure of list in a higher hierarchy, the controller 100 highlights and displays a particular portion of the list, and designates and activates it in a selection area. For example, as shown in FIG. 5C, if the controller 100 detects multi-touch signals on items 'B' and 'D' on a structure of a list at a higher hierarchy, the controller 100 highlights the items from 'B' to 'D' and designates and activates them in a selection area. After that, the controller 100 contracts the structure of the list according to a multi-touch signal corresponding to a contraction gesture. In this case, the items B-D are contained in one displayed group.

Figure 5D:
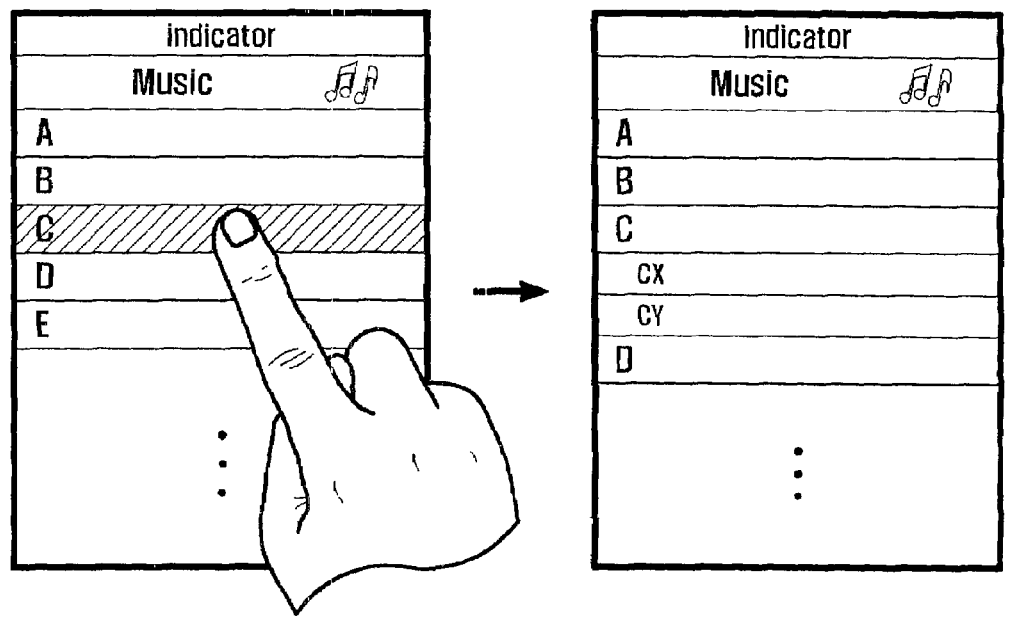
Figure 5E:
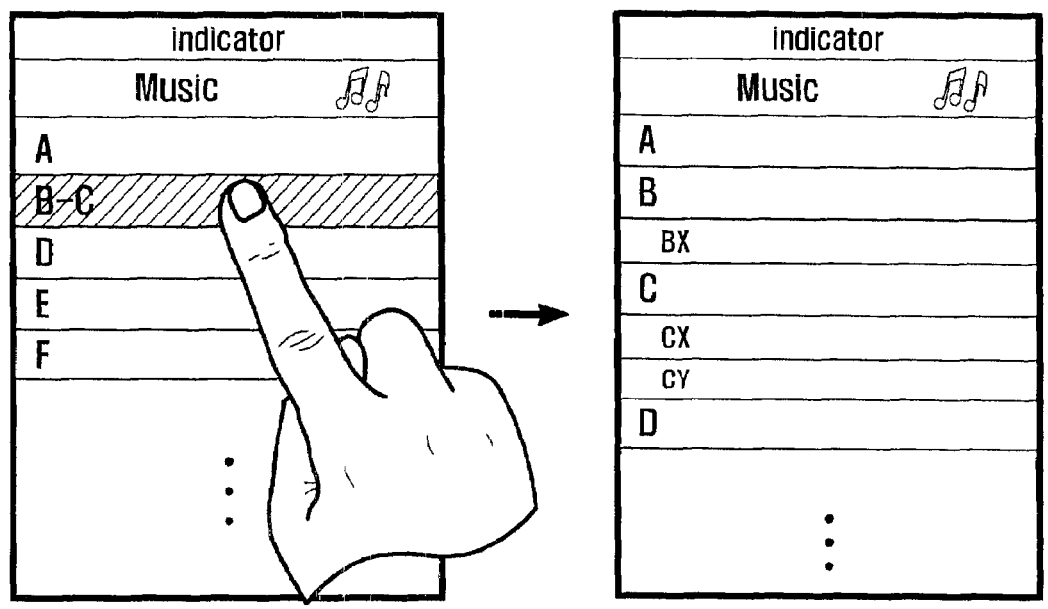

In an embodiment of the present invention, the structure of list can also be managed by using a single touch signal. For example, as shown in FIG. 5D, if an item 'C' on a touch screen is selected by a touch signal, the controller 100 highlights the item 'C' and designates and activates it in a selection area. After that, the controller 100 displays sub-items, contained in the item (or list), for example, songs or items, 'Cx' and 'Cy'. In addition, as shown in FIG. 5E, if an item 'B-C' on the touch screen is selected by a touch signal, the controller 100 highlights the item 'B-C' and designates and activates it in a selection area. After that, the controller 100 displays sub-items, for example, song, 'Bx' contained in item 'B', and songs, 'Cx' and 'Cy' contained in item C, respectively.

Figure 5F:
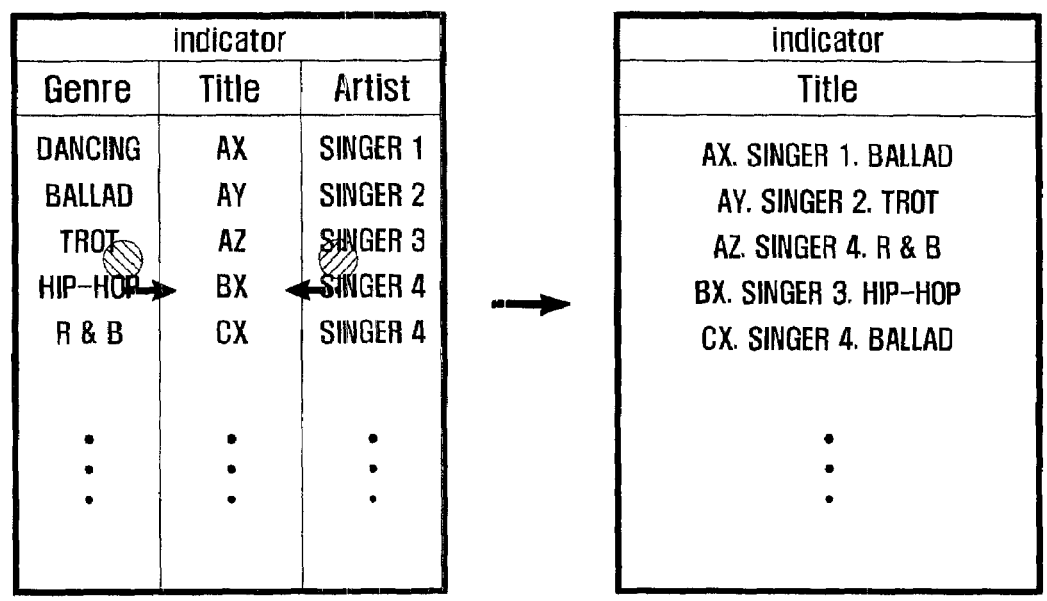

In an embodiment of the present invention, if the controller 100 detects a touch signal that is input onto a touch screen on which lists of contents are displayed by categories, it can integrate the categories of lists. If the controller 100 detects a gesture for expanding a list, the controller 100 integrates the categories according to a corresponding touch signal. For example, as shown in FIG. 5F, if the controller 100 detects a touch signal input onto a touch screen on which categories, for example, genre, title, and musician, are displayed, it integrates the sorted categories by a category of title, according to a touch signal, and then displays it on the touch screen.

FIG. 6A to FIG. 6G show user interfaces for describing alteration regarding structure of icons according to an embodiment of the present invention.

Referring to FIG. 6A to FIG. 6G, the controller 100 can alter a structure of a list that is displayed in an icon form.

Figure 6A:
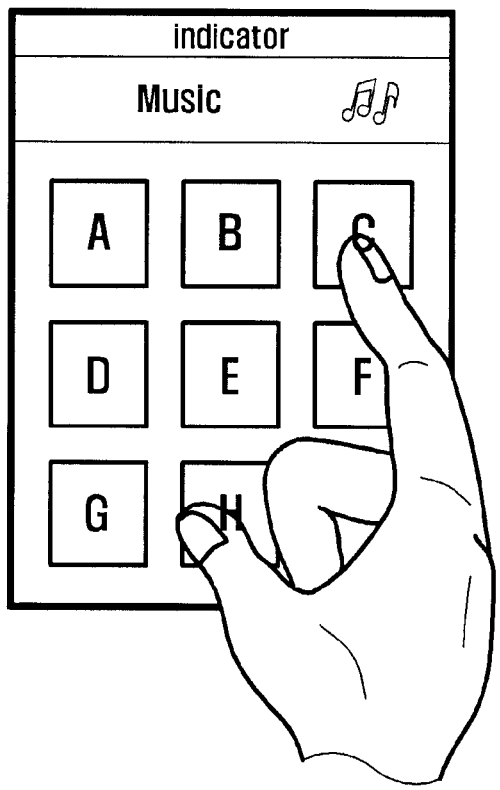
FIG. 6A to FIG. 6G show user interfaces for describing alterations regarding the structure of icons according to an embodiment of the present invention.
Figure 6B:
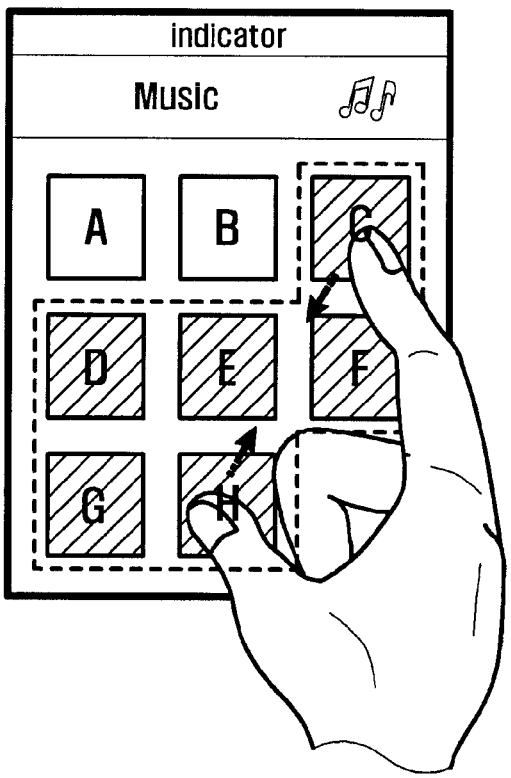

The controller 100 can contract icons, input by multi-touch signals, into a single icon. For example, as shown in FIG. 6A, the controller 100 identifies that icons 'C' and 'H' are selected by multi-touch signals. As shown in FIG. 6B, the controller 100 highlights from the icons 'C' to 'H' and designates and activates them in a selection area. The controller 100 identifies a gesture by the multi-touch signals.

Figure 6C:
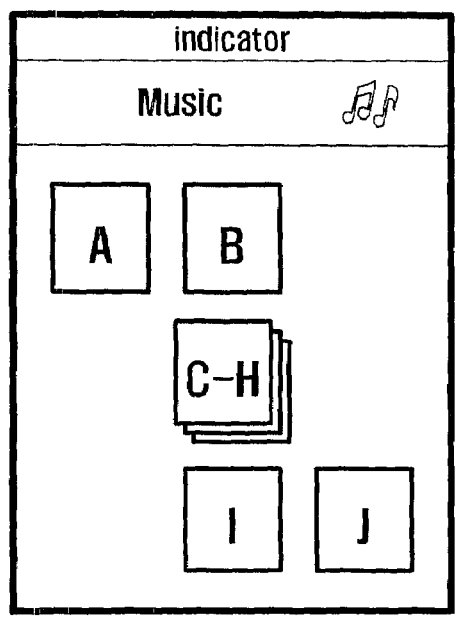
Figure 6D:
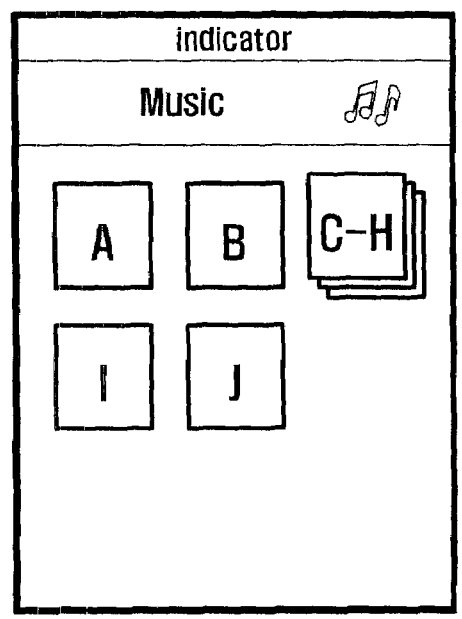

When the controller 100 detects a gesture for integrating icons, it contracts the icons in the selection area, and displays the contracted icon on a touch screen according to an arrangement option. If a function for expanding and integrating icons in a selection area is executed, the controller 100 arranges and displays the icons in the selection area according to an icon arrangement option. The arrangement option includes a location fixation arrangement and an automatic arrangement. For example, the controller 100 can arrange and display a contracted icon and other icons, in a location fixation arrangement as shown in FIG. 6C, or in an automatic arrangement as shown in FIG. 6D.

Figure 6E:
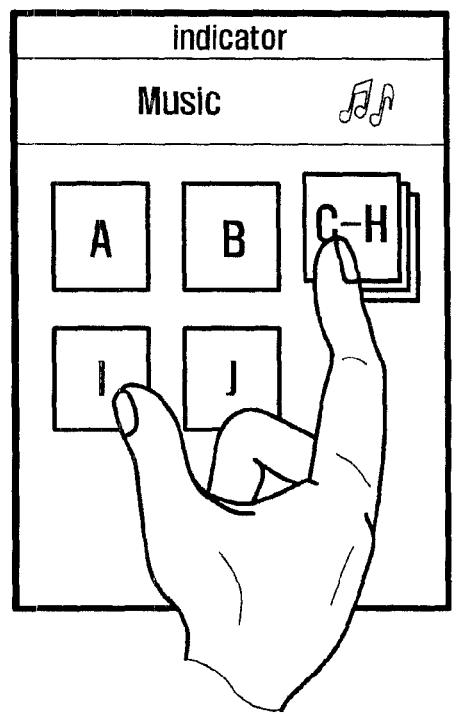
Figure 6F:
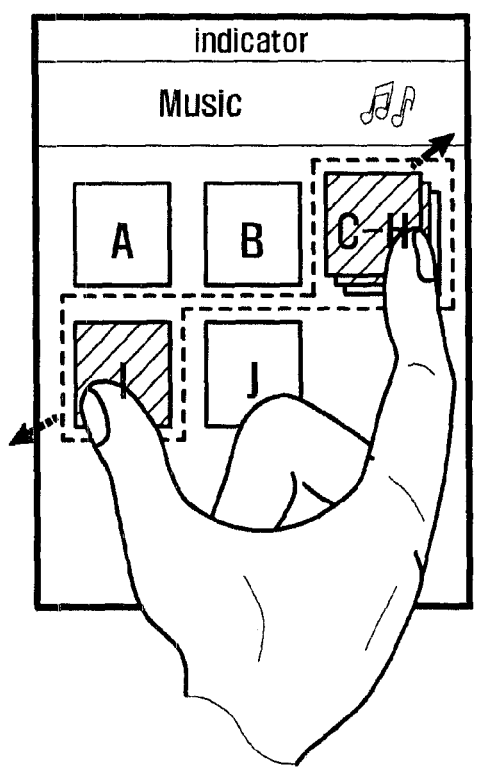

The controller 100 can also serve to separate and expand a contracted icon into respective icons. For example, as shown in FIG. 6E, the controller 100 identifies that icons 'C-H' and 'I' are selected by multi-touch signals. As shown in FIG. 6F, the controller 100 highlights from the icons 'C-H' to 'I' and designates and activates them in a selection area. The controller 100 identifies a gesture by the multi-touch signals.

Figure 6G:
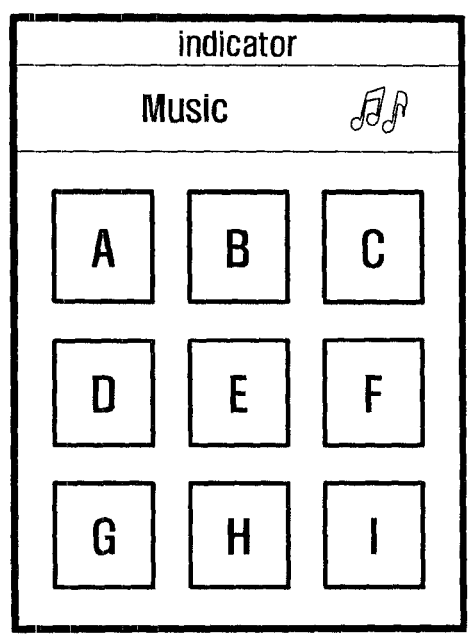

When the controller 100 detects a gesture for expanding icons, it expands the icons in the selection area, and displays them, on a touch screen according to an arrangement option. If a function for expanding icons in a selection area is executed, the controller 100 arranges and displays the icons in the selection area, according to a preset icon arrangement option. The arrangement option includes a location fixation arrangement and an automatic arrangement. For example, the controller 100 can separate and expand the contracted icon into respective icons, as shown in FIG. 6G.

The above-described methods according to the present invention can be realized in hardware or as software or computer code that can be stored in a recording medium such as a CD ROM, an RAM, a floppy disk, a hard disk, or a magneto-optical disk or downloaded over a network, so that the methods described herein can be executed by such software using a general purpose computer, or a special processor or in programmable or dedicated hardware, such as an ASIC or FPGA. As would be understood in the art, the computer, the processor or the programmable hardware include memory components, e.g., RAM, ROM, Flash, etc. that may store or receive software or computer code that when accessed and executed by the computer, processor or hardware implement the processing methods described herein.

As described above, the list managing method and apparatus, according to the present invention, can allow users to change the structure of lists of contents using multi-touches, so that the users can easily manage contents.

Furthermore, the list managing method and apparatus, according to the present invention, can allow users to categorize contents and intuitively move categorized contents in a list, so that the user can easy manages a list of contents.

Although exemplary embodiments of the present invention have been described in detail hereinabove, it should be understood that many variations and modifications of the basic inventive concept herein described, which may be apparent to those skilled in the art, will still fall within the spirit and scope of the exemplary embodiments of the present invention as defined in the appended claims.

What is claimed is:

1. A method for managing lists using multi-touch, comprising:
   detecting a multi-touch on a list displayed on a touch screen;
   identifying a gesture generated by the multi-touch;
   determining whether a selection area for altering a structure of the list is a particular portion of the list or the entire list, according to a comparison between a touch input time period for which the multi-touch is maintained following the detection of the multi-touch until the identification of the gesture and a preset activation time period; and
   displaying an altered structure of the list by altering the structure of the determined selection area of the list according to the gesture.

2. The method of claim 1, wherein altering the structure of the list further comprises:
   designating at least one item corresponding to a location of the detected multi-touch as the selection area for altering a structure of the list.

3. The method of claim 1, wherein identifying the gesture generated by the multi-touch further comprises:
   identifying multi touched points; and
   identifying a movement from the multi-touched points.

4. The method of claim 3, wherein the movement comprises a motion signal for expanding the list from a higher hierarchy to a lower hierarchy or contracting the list from a lower hierarchy to a higher hierarchy.

5. The method of claim 3, wherein identifying the gesture generated by the multi-touch comprises:
   determining the gesture as expanding the structure of a list when a distance between the multi-touched points is increased or the gesture as contracting the structure of a list when a distance between the multi-touched points is decreased.

6. The method of claim 4, wherein displaying the altered structure of the list comprises:
   designating at least one item corresponding to a location of the detected multi-touch as the selection area for altering a structure of the list; and
   displaying, when the gesture produces the motion signal for expanding the list, at least one sub-item of a lower hierarchy associated with the at least one item designated as the selection area.

7. The method of claim 4, further comprising:
   detecting the gesture as a multi-touch gesture for contracting the list; and
   displaying at least one item of a higher hierarchy by contracting at least one sub item designated as at least part of the selection area.

8. The method of claim 7, further comprising:
   displaying an integrated item by integrating the at the least one item of the higher hierarchy.

9. A method for managing lists using a multi-touch input device, comprising:
   displaying a list on a touch screen;
   detecting a multi-touch on the list;

detecting a gesture generated by the multi-touch;

determining whether a selection area for altering a structure of the list is a particular portion of the list or an entire list, according to a touch input time between the detection of the multi touch and the gesture;

comparing the touch input time with a preset activation time period;

designating, if the touch input time is less than the activation time period, the entire list as the selection area;

designating, if the touch input time for a time period is equal to or greater than the activation time period, a particular portion of the list as the selection area; and displaying an altered structure of the list by altering the structure of the determined selection area of the list according to the gesture.

10. An apparatus for managing using multi touch processing, comprising:

a display unit for displaying a list on a touch screen; and a controller configured to:

detect a multi-touch on the displayed list;

identifying a gesture generated by the multi-touch;

determine whether a selection area for altering a structure of the list is a particular portion of the list or the entire list, according to a comparison between a touch input time period for which the multi-touch is maintained following the detection of the multi-touch until the identification of the gesture and a preset activation time period; and cause an altered structure of the list to be displayed by altering the structure of the determined selection area of the list according to the gesture.

11. The apparatus of claim 10, wherein the controller designates at least one item corresponding to a location of the detected multi-touch as the selection area for altering a structure of the list, and identifies multi touched points and a movement generated by the multi-touched points.

12. The apparatus of claim 11, wherein the movement corresponds to a motion signal for expanding the determined selection area from a higher hierarchy to a lower hierarchy or contracting the determined selection area from a lower hierarchy to a higher hierarchy.

13. The apparatus of claim 12, wherein the controller determines the gesture as expanding the structure of the list when a distance between the multi-touched points is increased or detects the gesture as contracting the structure of the list when a distance between the multi-touched points is decreased.

14. The apparatus of claim 12, wherein the controller:

displays, when the gesture produces the motion signal for expanding the list, at least one sub-item of a lower hierarchy associated with the at least one item designated as the selection area.

15. The apparatus of claim 10, wherein the controller:

detects the gesture as a multi-touch gesture for contracting the list; and displays at least one item of a higher hierarchy by contracting at least one sub item designated as at least part of the selection area by the multi-touch gesture.

16. The apparatus of claim 15, wherein the controller:

displays an integrated item by integrating the at the least one item of the higher hierarchy.

\* \* \* \* \*

UNITED STATES PATENT AND TRADEMARK OFFICE
CERTIFICATE OF CORRECTION

| | | |
|---|---|---|
| PATENT NO. | : 9,310,993 B2 | Page 1 of 1 |
| APPLICATION NO. | : 12/555944 | |
| DATED | : April 12, 2016 | |
| INVENTOR(S) | : Hyong Uk Choi | |

It is certified that error appears in the above-identified patent and that said Letters Patent is hereby corrected as shown below:

On the Title Page

Item 30, Line 1 should read as follows:
--...Oct. 6, 2008 (KR) 10-2008-0097700...--

Signed and Sealed this
Seventh Day of June, 2016

Michelle K. Lee
*Director of the United States Patent and Trademark Office*